United States Patent Office 2,980,264
Patented Apr. 18, 1961

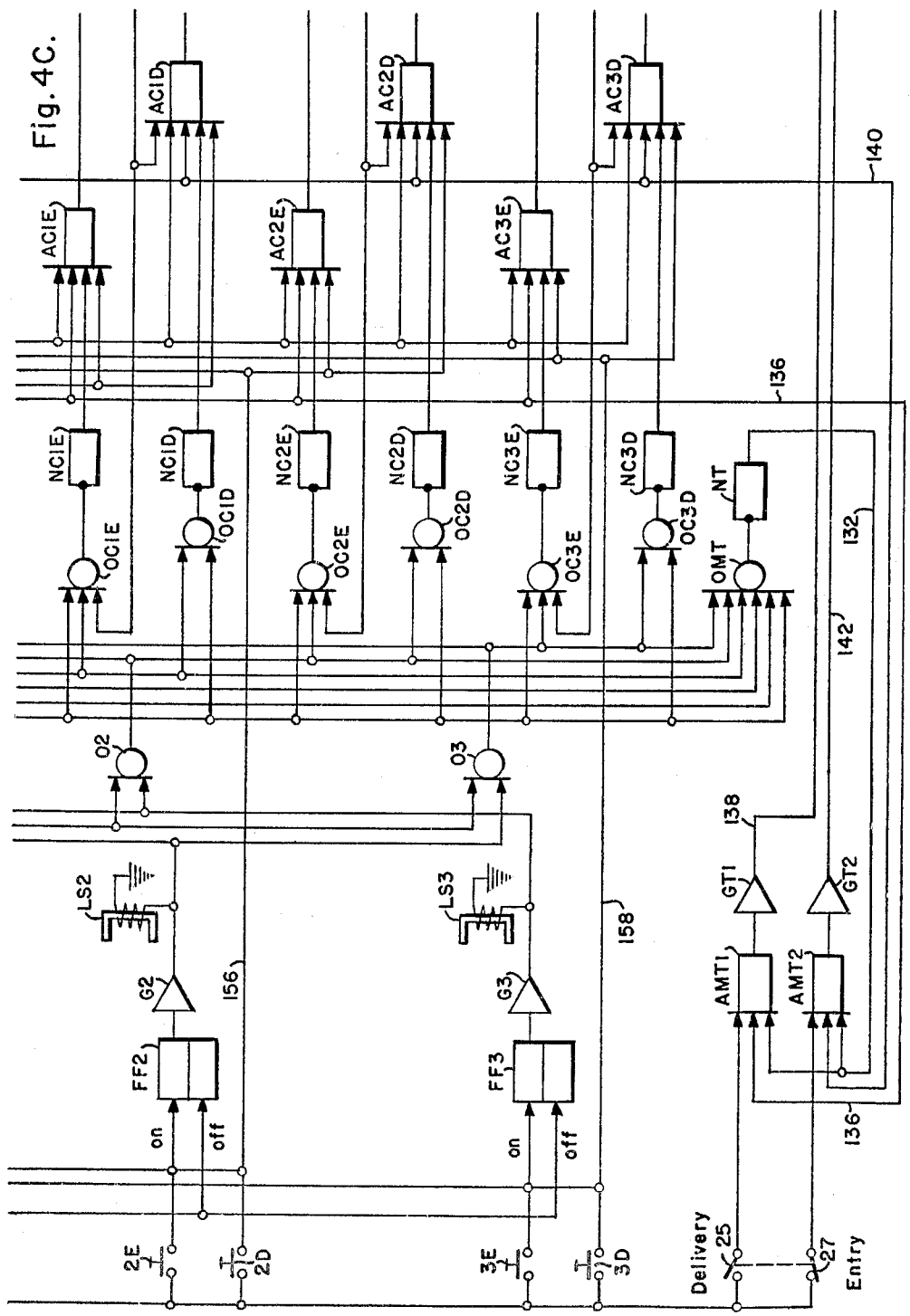

2,980,264

CONTROL SYSTEM FOR A LOAD POSITIONING DEVICE

Donald A. Burt, Murrysville, and John W. Cook, Monroeville, Pa., assignors to Westinghouse Electric Corporation, East Pittsburgh, Pa., a corporation of Pennsylvania Filed June 12, 1957, Ser. No. 665,238

4 Claims. (Cl. 212—132)

The present invention relates, in general, to a control system for a load positioning device, and more particularly relates to an automatically operative control system for a load positioning device for use with an ingot temperature soaking furnace including a plurality of ingot temperature soaking positions or like device.

It is an object of the present invention to provide an improved control apparatus for a load positioning device, which automatically moves or positions a load member relative to a predetermined one of a plurality of load member positions.

It is another object to provide an improved control system for a load positioning device which automatically positions a load member in a predetermined one of a plurality of available load positions, and which prevents the load positioning device from so operating if another load member is already in said predetermined load position.

It is a further object of the present invention to provide an improved load positioning device control system that includes a MEMORY device for remembering the positions of a plurality of load members, and for automatically controlling the operation of said load positioning device relative to the adding of additional load members or removing one or more of said plurality of load members.

It is a specific object of the present invention to provide an improved control system for a load hoist or crane device and operative with a load member temperature controlling furnace having a pularity of load positions, wherein the hoist or crane device is automatically controlled in its operations to move and handle one or more of a plurality of load members relative to said load positions.

It is another specific object of the present invention to provide an improved control system for a load hoist or crane device operative with a plurality of load positions and including a load entry position and a load delivery position, wherein the hoist or crane device is selectively controlled automatically between said entry and said delivery position and relative to any of said load positions as may be selected for receiving or delivering a load member.

It is a different object of the present invention to provide an improved control system for a load positioning device that prevents a load member from being moved to a position where another load member is already located, and further that is responsive to the position of the load positioning device itself for better controlling the movement and positioning of the load members by said load positioning device.

These, and other objects and advantages of the present invention will become apparent in view of the following description taken in conjunction with the drawings, wherein.

Figure 5:
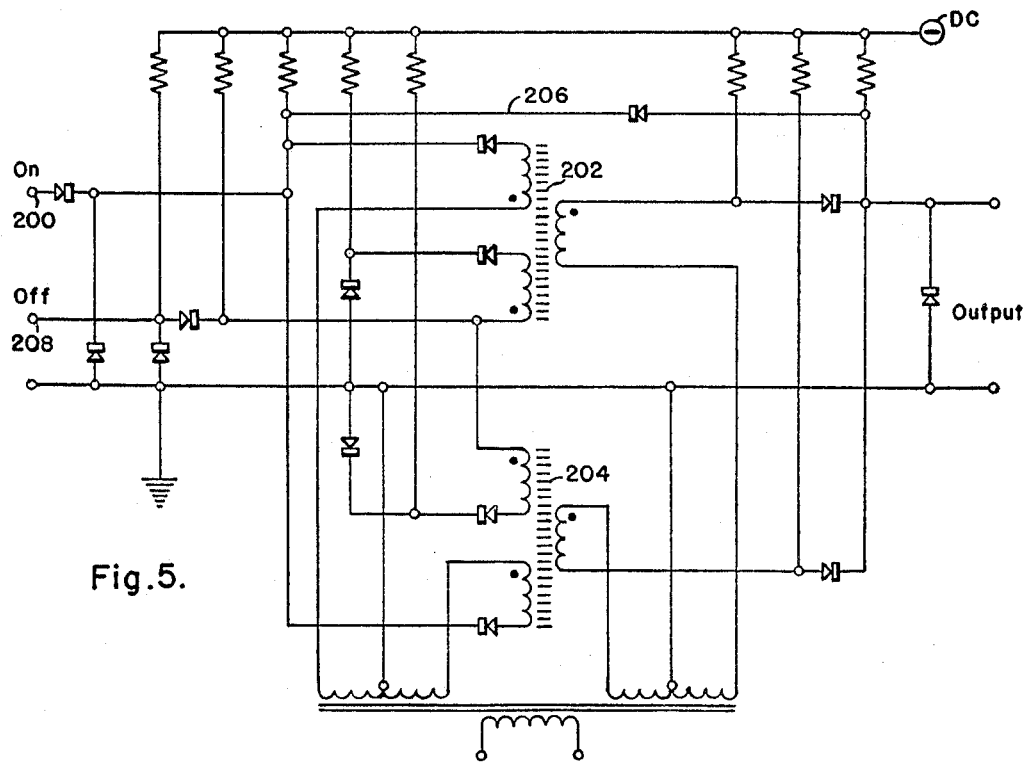
Figure 4A:
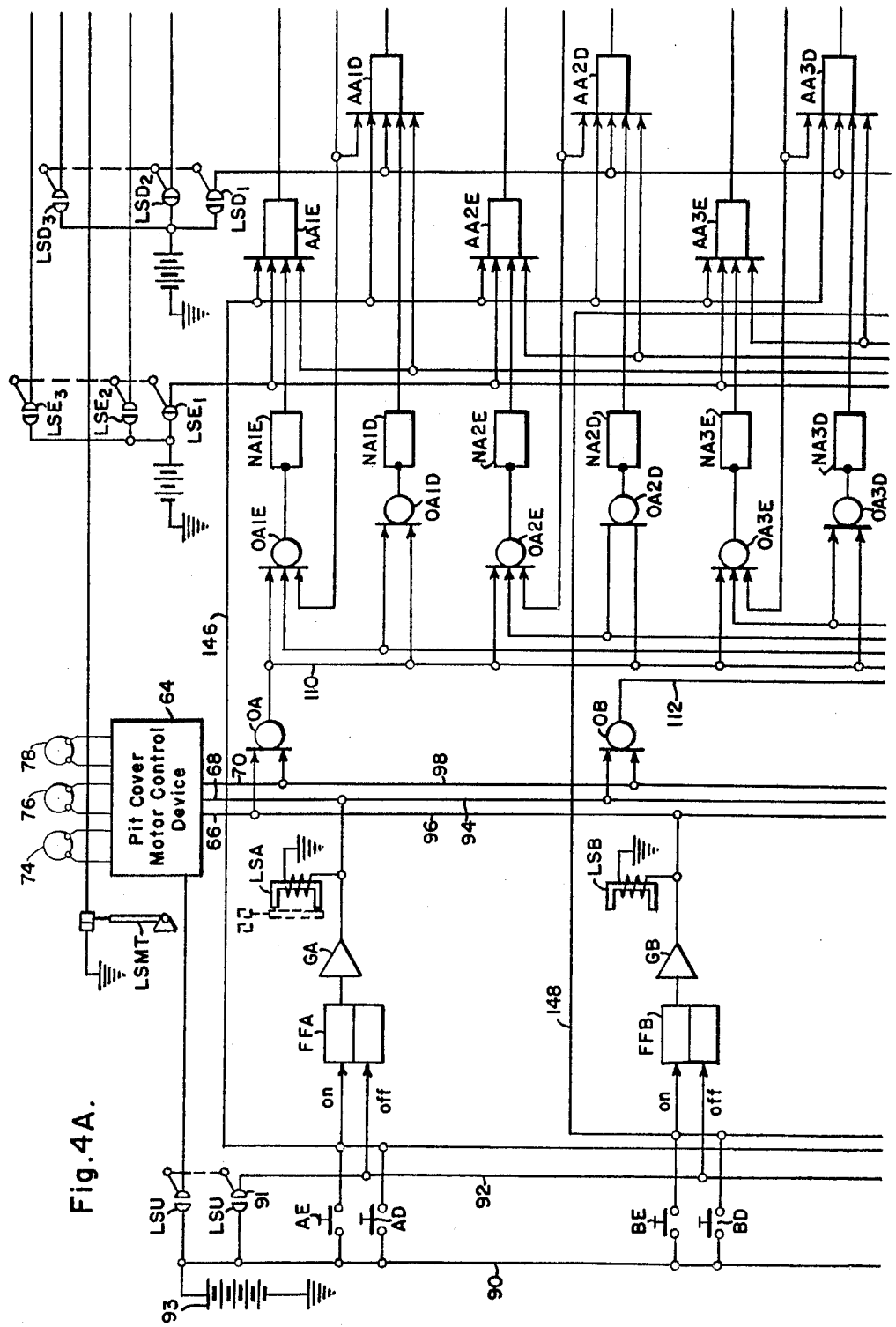
Figure 4B:
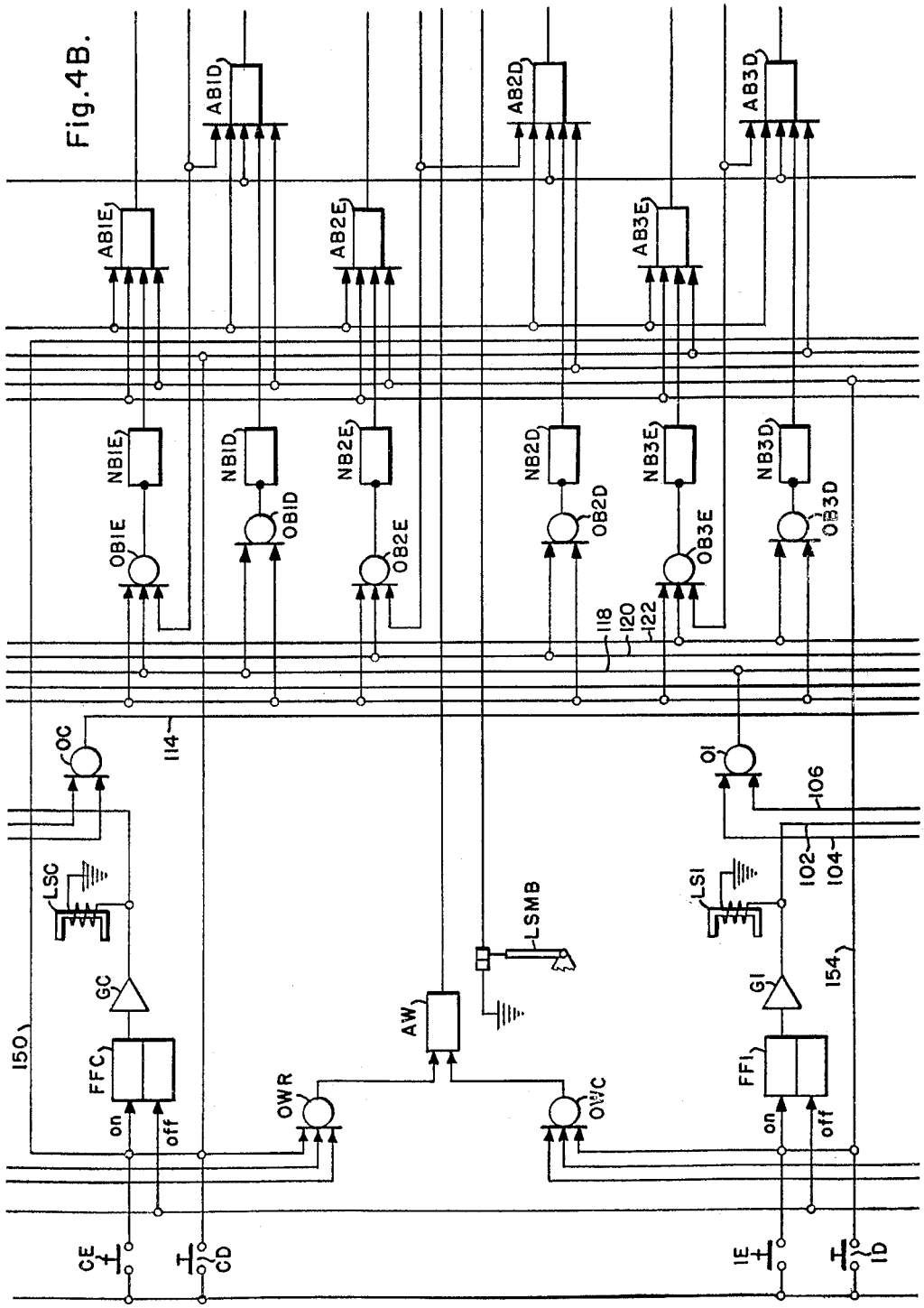
Figure 4D:
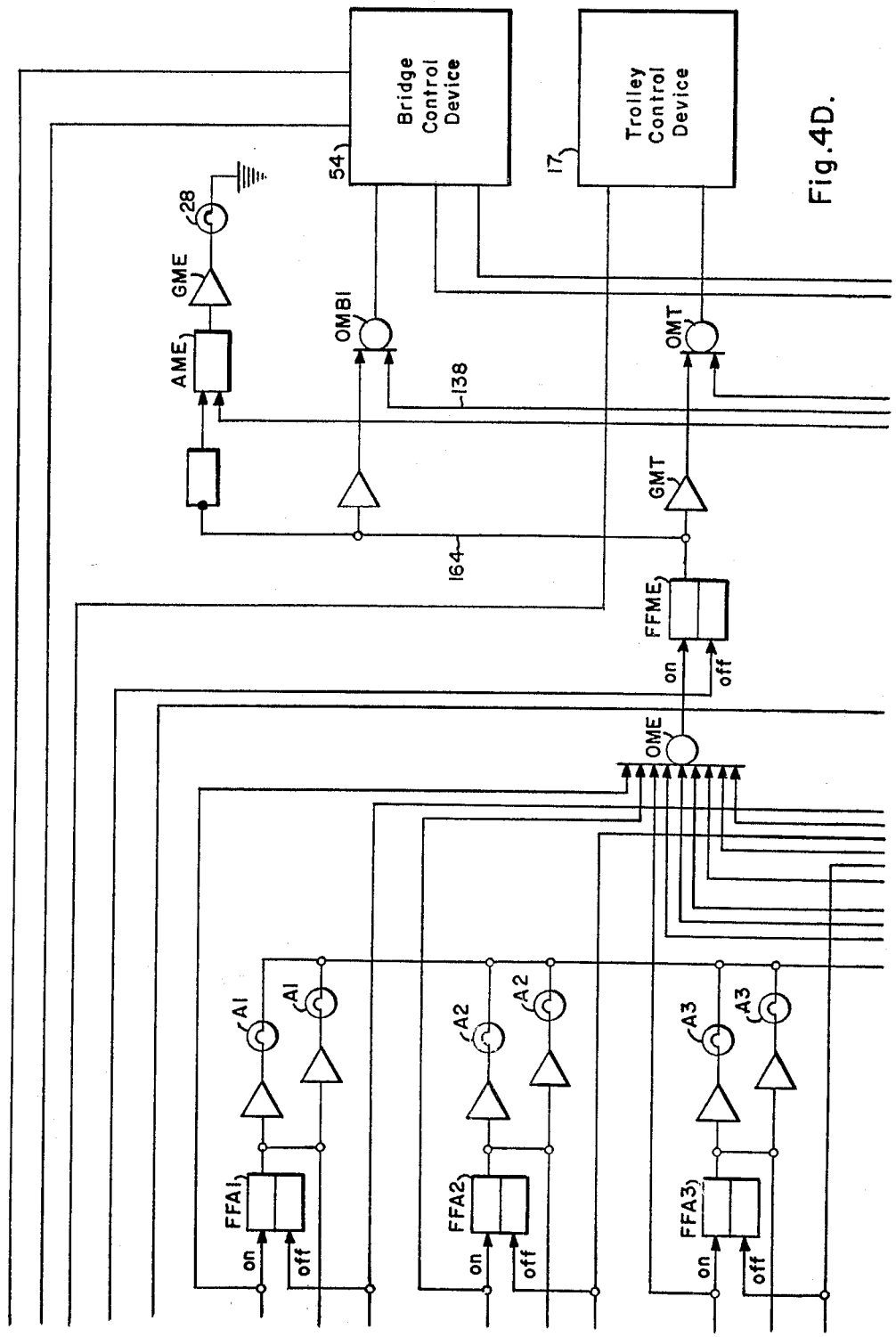
Figure 4E:
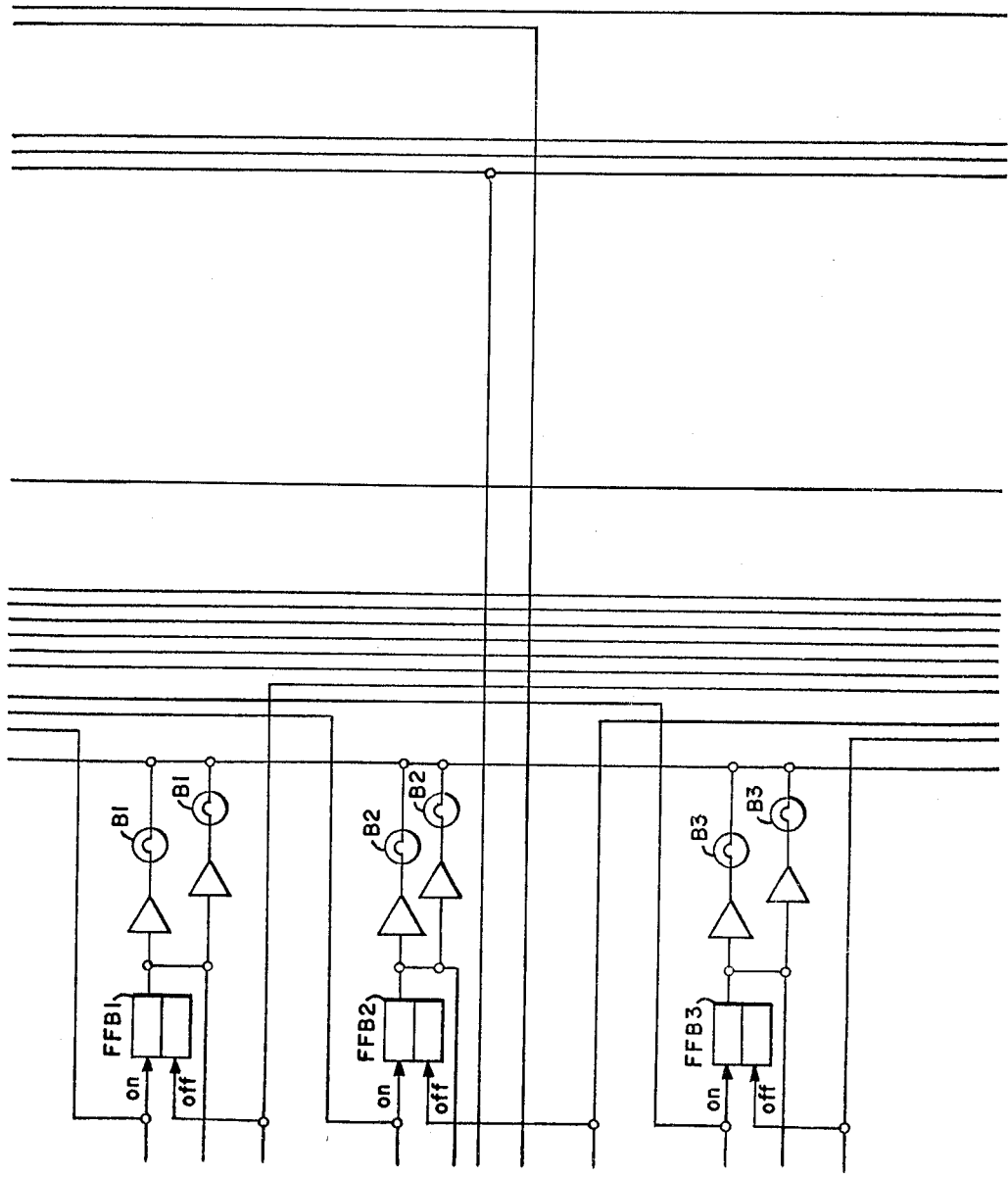
Figure 4F:
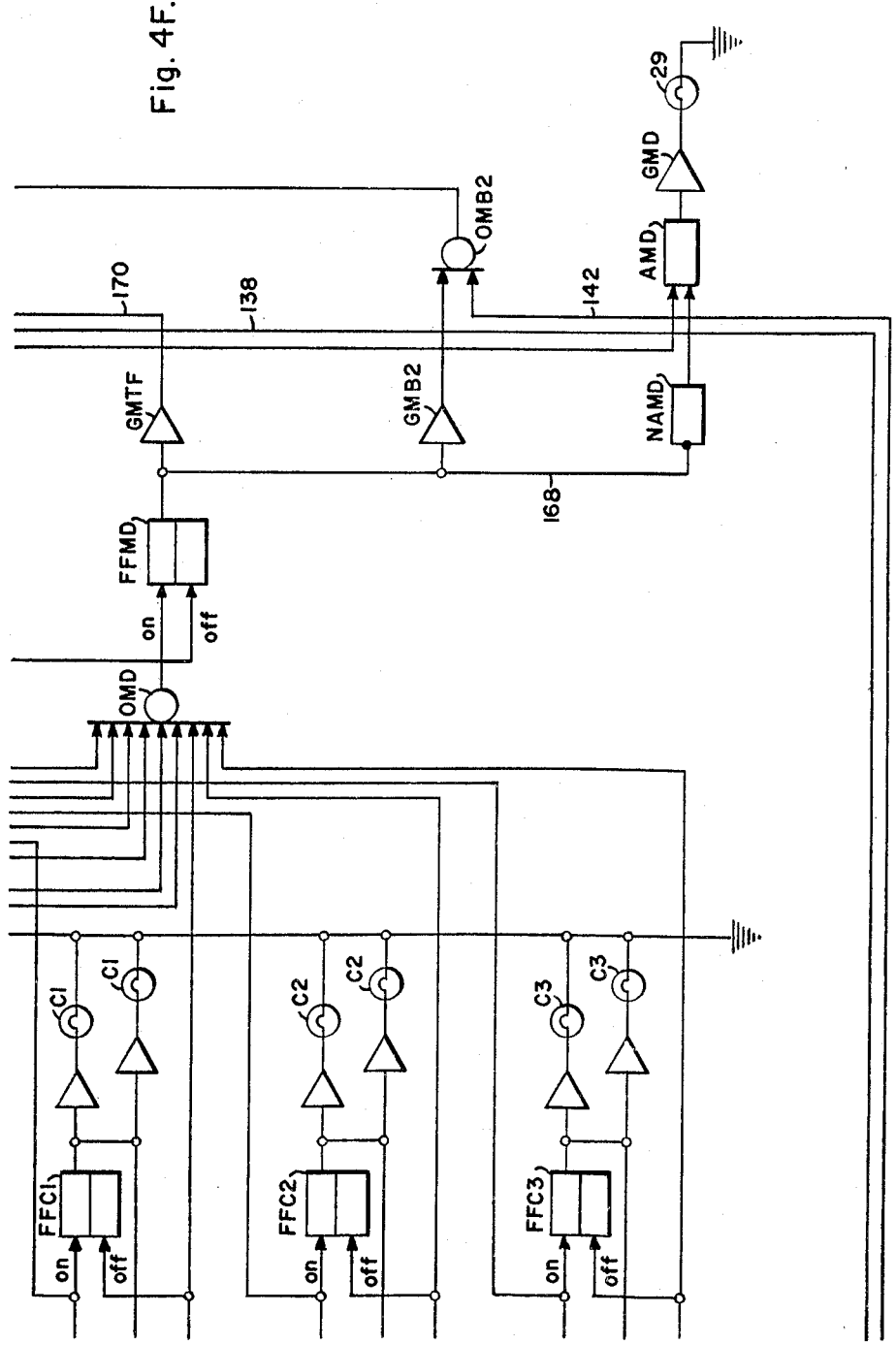

Fig. 4 (including Figs. 4A, 4B, 4C, 4D, 4E and 4F) is a schematic view of the control apparatus in accordance with the present invention; and Fig. 5 shows one form of MEMORY device suitable for use with the present control apparatus.

Figure 1:
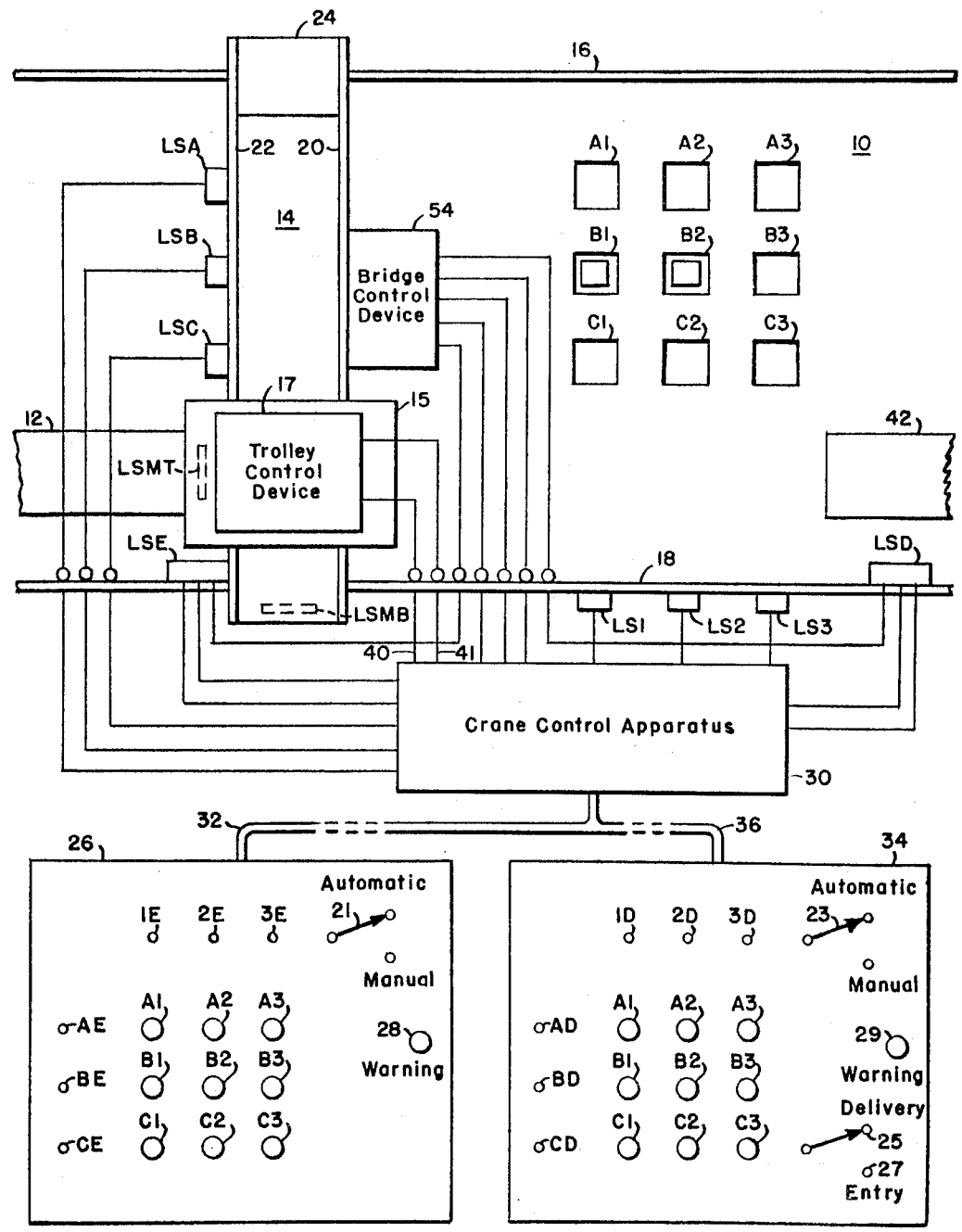
Figure 1 is a diagrammatic view illustrating one form of the control apparatus in accordance with the present invention.

In Fig. 1 there is shown a furnace 10 for heating ingots of metal or like material or other load members and including a plurality of load positions A1, A2, A3, B1, B2, B3, C1, C2 and C3. In the operation of the control apparatus in accordance with the present invention, it is desirable to remove workpieces from an entry conveyor or like member 12 by means of a load hoist or crane device 14 movable in a first direction along fixed rail members 16 and 18 and movable in a second and transverse direction along rail members 20 and 22 of the bridge member 24. The crane member 14 includes a trolley device 15 having wheels movable along the rails 20 and 22 of the bridge member 24, while the latter bridge member 24 is provided with wheels movable along the rail members 16 and 18. The workpieces are carried by the crane device 14 from the entry conveyor member 12 to a preselected one of the load positions A1 through C3.

In Fig. 1, nine such load positions are illustrated; however, it should be understood that the teachings of the present application are suitable to any reasonable desired number of load positions. An entry control device 26 is provided including a first control switch A, a second control switch B and a third control switch C corresponding to the horizontal rows of positions in the furnace 10 as shown in Fig. 1. The entry control device 26 is further provided with control buttons or switches 1 through 3 corresponding respectively to the vertical rows of load positions within the furnace 10. An indicator light, as shown in Fig. 1, is provided on the entry control device for each of the load positions within the furnace 10. A warning light 28 is provided and an automatic and manual selector switches, respectively, are provided. The entry control device 26 is connected to a master hoist or crane control apparatus 30 through a multiple conductor cable 32.

A delivery control device 34 is provided with similar control switches A, B and C corresponding to the horizontal rows of load positions within the furnace 10 and with similar control switches 1 through 3 corresponding to the respective vertical rows of load positions within the furnace 10. The delivery control device 34 is connected to the control apparatus 30 through a multiple conductor cable 36.

A plurality of limit switches or devices are provided, with one being provided for each horizontal row of load positions within the furnace 10, said limit switches being marked LSA, LSB and LSC, respectively. These limit switches are each connected through a conductor provided with a trolley or suitable sliding contact to the control apparatus 30 as shown. A second plurality of limit switches are provided for each vertical row of load positions and are marked LS1 through LS3 as shown in Fig. 1, and are similarly connected through suitable conductors to the control apparatus 30. The output of the control apparatus is connected through conductors 40 and 41 to the trolley control device 17 for controlling the operation of the trolley device 15 and are each provided with a suitable sliding contact to allow the trolley device 15 and the bridge member 24 to move along the rails 16 and 18 and relative to the control apparatus 30. A limit switch LSE is provided along the movement path of the bridge member 24 for indicating when the crane device 14 is in position over the entry conveyor 12 to receive a load member. Another limit switch member LSD is provided for indicating by a suitable control signal when the crane device 14 is in its delivery position over the delivery conveyor 42 for delivering a load member from the furnace 10 to the delivery conveyor 42.

Each of the AND, NOT and FLIP-FLOP logic devices requires a power supply (not shown) to make them operative as well known to persons skilled in this art, and the manual control contactor 21 at the entry control device 26 and the manual control conductor 23 at the delivery control device 34 may be connected to control the energization of all of these logic devices, if desired. When both of the contactors 21 and 23 are positioned in their automatic setting, then the logic devices are energized.

Figure 2:
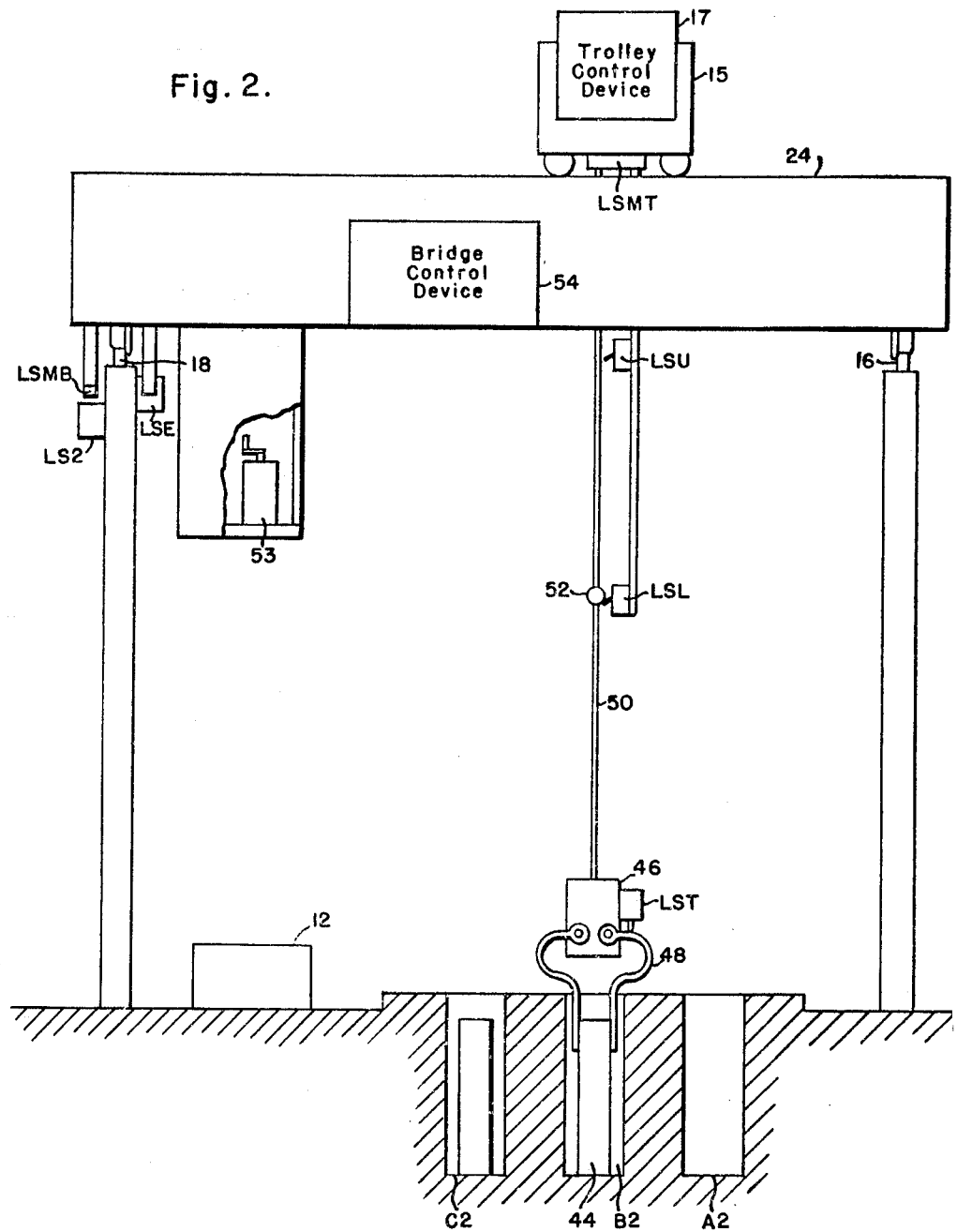
Fig. 2 is a diagrammatic view illustrating the operation of a portion of the control apparatus in accordance with the present invention.

In Fig. 2 the trolley device 15 is shown in position for handling a workpiece 44 relative to one of the load positions of the furnace 10, for example, the B2 load position of the furnace 10. A limit switch 46 is provided for indicating by a suitable control signal when the load member handling tongs 48 are either in a position to grip the load member 44 or by a suitable control signal for indicating when the tongs 48 have released a load member 44. The trolley device 15 includes a lifting cable 50 provided with a weight member 52 that is operative with a limit switch LSL to indicate when the load member 44 is in its lower position within the load position B2, as illustrated in Fig. 2. An upper limit switch LSU is carried by the trolley device 15 for providing a suitable control signal to indicate when the tongs 48 and perhaps the load member 44 are in their upper position.

In this regard, it should be understood that the crane device 14 includes suitable hoisting motors, brakes and the like well known pieces of apparatus of cranes or load hoisting devices and further, that the bridge control device 54 provided for the crane device 14, is operative in the well-known manner to control the bridge motor and associated apparatus as needed to move the crane device in a first direction along the bridge member 24 and between the rail members 16 and 18 and further, the crane control 54 is operative with suitable motors and other control equipment for moving the bridge member 24 in a second direction along the rail members 16 and 18. Further, it should be understood that a conventional drum type of control unit 53, or if desired a master switch unit, may be provided as well known to persons skilled in this art, in the event that it should become desirable to control the crane manually.

Figure 3:
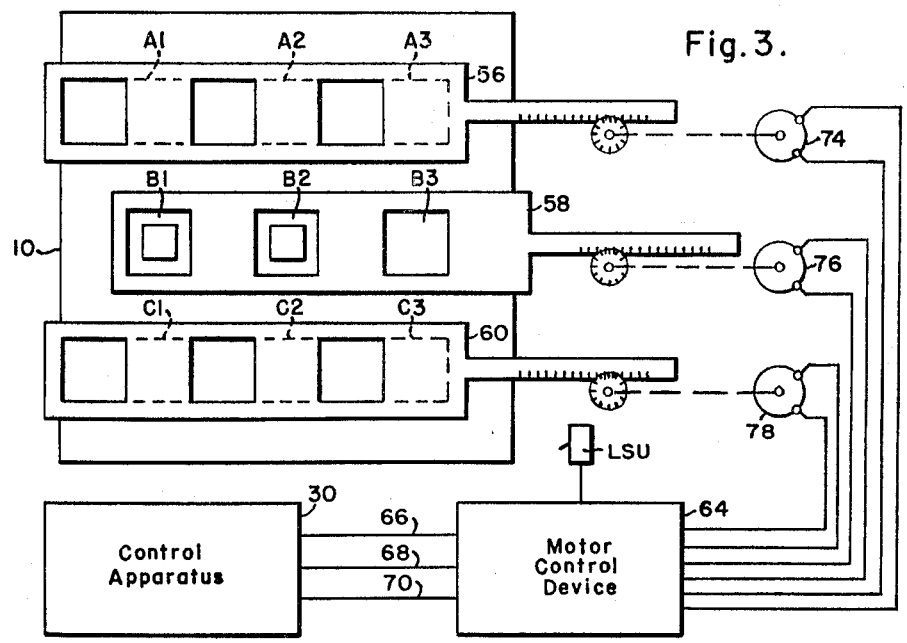
Fig. 3 is a diagrammatic view illustrating the operation of another portion of the control apparatus in accordance with the present invention.

In Fig. 3 the furnace 10 is shown with nine load positions A1 through C3 as illustrated. A first cover member 56 is provided for covering the load positions A1 through A3 in the A-horizontal row of load positions. A second cover member 58 is provided for similarly covering the load positions in the horizontal row B. A cover 60 is provided for similarly covering the load positions in the horizontal row C. A motor control device 64 is provided for receiving a suitable control signal from the control apparatus 30 through conductors 66, 68 and 70 for indicating which one of the respective motors 74, 76 and 78 is to be operated. In this regard, the limit switch LSU shown in Fig. 2, may be connected to the motor control device 64 and connected to one input of a respective AND device provided within the motor control device 64 for each of the conductors 66, 68 and 70, such that when the control apparatus 30 indicates that a load member is to be either put into or taken from a load position, for example, the load position in the horizontal row A of load positions, then the motor 74 will be operated by the motor control device 64 when the limit switch LSU is operated by the weight member 52 shown in Fig. 2 moving away from the limit switch LSU when the load member 44 is moving in a direction toward said load position in the horizontal row A. Further, the conductor 68 would provide a control signal to the other input of the AND device for the row A cover control motor. This would cause the motor 74 to move the cover member 56 to the right to open each of the load positions in the horizontal row A. Suitable limit switches could be provided to indicate when the cover has moved to its open position or closed position. In this regard, it is to be understood that an individual motor and cover member may be provided for each load position in the furnace 10, if desired, in which case the motor control device 64 could include an AND device for each of the load positions and be energized by control signals corresponding to both one of the horizontal row of load positions and one of the vertical row of load positions involved to determine which load position is to be uncovered. For reclosing the load position cover member, the signal for doing this may be obtained from the upper limit switch LSU when the weight member 52 is lifted to contact said limit switch.

In Fig. 4 there is shown an electrical schematic view of one form of the control apparatus in accordance with the present invention. In Fig. 4 the control buttons AE, BE, CE, 1E, 2E and 3E for the entry control device 26 shown in Fig. 1, are shown, as are the control buttons AD, BD, CD, 1D, 2D and 3D for the corresponding delivery control device 34. It should be noted that the control buttons AE and AD are connected in parallel and between a conductor 90, energized by a suitable voltage source 92, and the On input to a FLIP-FLOP device FFA. The control buttons BE and BD are connected in parallel between said conductor 90 and the On input of a FLIP-FLOP device FFB. The buttons CE and CD are connected in parallel between the conductor 90 and the On input of a FLIP-FLOP device FFC. The control buttons 1E and 1D are connected in parallel between the conductor 90 and the On input of a FLIP-FLOP device FF1. The control buttons 2E and 2D are connected in parallel between the conductor device 90 and the On input of a FLIP-FLOP device FF2. The control buttons 3E and 3D are connected in parallel between the conductor 90 and the On input of a FLIP-FLOP device FF3. The above-described control buttons, when closed, are each operative to turn on their respective FLIP-FLOP device to provide an output signal from said respective FLIP-FLOP device which otherwise would not have an output signal when said FLIP-FLOP device is turned off.

In this regard, the upper limit switch LSU, shown in Fig. 2, is provided with a pair of contact buttons 91 operative to provide a control signal through the conductor 92, shown in Fig. 4, which is commonly connected to the Off input of each of the above-described FLIP-FLOP devices for turning said FLIP-FLOP devices off in response to a downward movement of the weight member 52 and the tongs 48 shown in Fig. 2. Each of the respective FLIP-FLOP devices FFA through FFC and FF1 through FF3 are connected through respective amplifier devices GA through GC and G1 through G3 as shown to respective limit switch devices LSA through LSC operative with a magnetically operated contact arm or member LSMT operative with the trolley control device 17 and LS1 through LS3 operative with a magnetically operated contact arm or member LSMB operative with the bridge control device 54 as shown in Fig. 4. A plurality of OR devices OA through OC are provided for the respective rows of load positions of the furnace 10 for the horizontal rows A through C and a plurality of OR devices O1 through O3 are provided for the respective vertical rows of load positions 1 through 3. In this regard, the output of the FLIP-FLOP device FFA is connected through a conductor 94 to the inputs of each of the OR devices OB and OC, and not the OR device OA.

The output of the FLIP-FLOP FFB is connected through a conductor 96 to the input of each of the OR devices OA and OC, and not the OR device OB. The output of the FLIP-FLOP FFC is connected through a conductor 98 to the inputs of each of the OR devices OA and OB, and not the OR device OC. Similarly, the output of the FLIP-FLOP FF1 is connected through a conductor 102 to the inputs of each of the OR devices O2 and O3, and not the OR device O1. The output of the FLIP-FLOP FF2 is connected through the conductor 104 to the inputs of each of the OR devices O1 and O3, and not the OR device O2. The output of the FLIP-FLOP FF3 is connected through the conductor 106 to the input of each of the OR devices O1 and O2, and not the OR device O3. It should be here noted that each of the FLIP-FLOP devices as well known in this art is operative such that the On input turns the FLIP-FLOP on to thereby provide an output signal and the Off input turns the FLIP-FLOP off such that the device does not have an output signal. Each of the OR devices is operative to provide an output signal when any of its inputs are energized. Each of the AND devices is operative to provide an output only when all of its inputs are energized. In this regard, the NOT device provided in one input of several of the AND devices is operative to provide an output signal only when the input of the NOT device is not energized.

The output of the OR device OA is connected to an input of each of the OR devices in the group OA1E through OA3E, as shown in Fig. 4, through the conductor 110. Similarly, the output of the OR device OA is connected to an input of each of the OR devices in the group OA1D through OA3D through the conductor 110 as shown in Fig. 4. The output of the OR device OB is connected to an input of each of the OR devices in the group OB1E through OB3E through the conductor 112 as shown in Fig. 4. Similarly, the output of the OR device OB is connected to an input of each of the OR devices in the group OB1B through OB3D through the conductor 112. The output of the OR device OC is connected through a conductor 114 to an input of each of the OR devices in the group OC1E through OC3E, and similarly, to an input of each of the OR devices in the group OC1D through OC3D, as shown in Fig. 4. Similarly, the output of the OR device O1 is connected through a conductor 118 to an input of the OR device OA1E, the OR device OB1E and the OR device OC1E, as well as an input of the OR device OA1D, OB1D and OC1D. The output of the OR device O2 is connected through a conductor 120 to an input of each of the OR devices OA2E, OB2E and OC2E, and to an input of each of the OR devices OA2D, OB2D and OC2D.

The output of the OR device O3 is connected through the conductor 122 to an input of each of the OR devices OA3E and OA3D, also to an input of each of the OR devices OB3E and OB3D, also to an input of each of the OR devices OC3E and OC3D.

The output of each of the OR devices OA, OB, OC, O1, O2 and O3 is connected through suitable conductors as shown to respective inputs of the OR device OMT. The output of the OR device OMT is connected through a conductor 132 to an input of AND device AMT1 and an input of AND device AMT2 through a NOT device NT. A second input of the AND device AMT1 is energized through a conductor 136 by an entry table limit switch LSE1, as shown in Fig. 1. The entry table limit switch LSE1 provides a control signal to conductor 136 when the crane device is in its entry position. A third input of the AND device AMT1 may be energized by closing a delivery position transfer switch 25, shown in Fig. 1, and which may be located on the panel of the delivery control device 34. When all of the inputs of the AND device AMT1 are energized, an output is provided through the amplifier GT1 through the conductor 138 connected to one input of the OR device OMB1 for controlling the motor of the bridge 24, shown in Fig. 1, to move the crane to the delivery position of the crane where it may be stopped by a contact LSD3 of the limit switch LSD.

A second input of the AND device AMT2 is energized through a conductor 140 by a delivery table limit switch LSD1, shown in Fig. 4. A third input of the AND device AMT2 is energized by closing the entry position transfer switch 27. In this regard, it should be noted that the delivery position transfer switch 25 and the entry position transfer switch 27 are provided as part of the delivery control device 34 and are interconnected such that when one is closed, the other is opened. When all of the inputs of the AND device AMT2 are energized, an output is provided through an amplifier GT2 through a conductor 142 to an input of OR device OMB2 for controlling the motor of the bridge 24 shown in Fig. 1 for moving the bridge to the left from the delivery position to the entry position of the crane, where a contact LSE3 of limit switch LSE stops the bridge 24. The output of each of the entry controlling OR devices OA1E through OC3E are respectively connected to an input of a corresponding AND device AA1E through AC3E. Similarly, the output of each of the delivery controlling OR devices OA1D through OC3D are respectively connected to an input of a corresponding AND device AA1D through AC3D for controlling the operation of the crane device. In this regard, it should be noted that a respective NOT device NA1E through NC3D is included in each of these inputs of the respective AND devices, such that this input of each of the respective AND devices is energized when the corresponding NOT device does not have an input signal. A second input of each of the entry controlling AND devices AA1E through AA3E is energized through a conductor 146 when either of the position control buttons AE or AD are closed. Also, one input of each of the delivery controlling AND devices AA1D through AA3D is energized through the conductor 146. One input of each of the entry controlling AND devices AB1E through AB3E and one input of each of the delivery controlling AND devices AB1D through AB3D are energized through the conductor 148 when one of the control buttons BE or BD is closed. Similarly, an input of each of the entry controlling AND devices AC1E through AC3E and one input of each of the delivery controlling AND devices AC1D through AC3D is energized through the conductor 150 when either one of the control buttons CE or CD is closed. Similarly, when one of the control buttons 1E or 1D is closed it is effective to energize through the conductor 154, one input of each of the entry controlling AND devices AA1E, AB1E and AC1E. Also, these control buttons energize one input of each of the delivery controlling AND devices AA1D, AB1D and AC1D. Similarly, closing one of the control buttons 2E and 2D is effective through the conductor 156 to energize one input of each of the entry controlling AND devices AA2E, AB2E and AC2E, also to energize one input of the delivery controlling AND devices AA2D, AB2D and AC2D. Closing of one of the control buttons 3E and 3D energizes through the conductor 158, one input of the entry controlling AND devices AA3E, AB3E and AC3E and one input of each of the delivery controlling AND devices AA3D, AB3D and AC3D. When all of the inputs of any of these respective AND devices are energized, that AND device is effective to control the entry operation of the crane device or the delivery operation of the crane device. An output from any one of the entry controlling AND devices is applied to the On input of one of the subsequent FLIP-FLOP devices which when turned on, provides an output control signal to energize the appropriate indicator lights of the entry control device 26 and the delivery control device 34, as shown in Fig. 1. Further, the output of the latter one of the entry controlling AND devices is applied to an input of an entry operation controlling OR device OME which, in turn, controls or is connected to the On input of a FLIP-FLOP device FFME to turn it on and apply through an output conductor 164 a control signal to a second input of the OR device OMB1 for energizing the bridge control device 54 for controlling the bridge motor to move from the entry position of the crane device toward the furnace 10. The conductor 164 also energizes an input of a trolley controlling OR device OMT through an amplifier GMT1 to energize the trolley of the crane device 14 from its position, as shown in Fig. 1, adjacent the rail 18 toward the rail 16 until it is stopped by one of the limit switches LSA, LSB or LSC as previously energized by closing one of the control buttons AE through CE or AD through CD as previously described.

Similarly, each of the delivery controlling AND devices AA1D through AC3D is respectively operative to provide an output signal to an input of the delivery controlling OR device OMD to, in turn, energize the On input of a delivery controlling FLIP-FLOP device FFMD to provide a control signal through the conductor 168 to energize an input of the trolley controlling OR device OMT through the conductor 170 and amplifier device GMT2. Also, the FLIP-FLOP device FFMD through the conductor 168 energizes an input of the OR device OMB2 through an amplifier GMB2 to energize the bridge control device 54 and thereby energize the control motor for the bridge 24 to move the bridge 24 to the left from the delivery position of the bridge. Further, the conductor 168 energizes an input of a control AND device AND through a NOT device NAMD. The second input of the latter AND device AMD is energized by a suitable control signal provided when one of the row position buttons is closed and in conjunction with one of the column position control buttons being closed to provide an output signal through the respective OR devices OWR and OWC and the AND device AW, with the output of the AND device AMD passing through an amplifier device GMD to energize the warning light 29 of the delivery control device 34, as shown in Fig. 1.

The conductor 164 from the output of the entry position control FLIP-FLOP device FFME energizes an input of an entry controlling AND device AME. The second input of which is energized by the control signal from AND device AW when one of the row position control buttons is closed and one of the column position control buttons is closed. The output signal from the AND device AME is applied through a suitable amplifier GME to energize an entry warning light 28 of the entry control device 26, as shown in Fig. 1. The output signal from the FLIP-FLOP devices FFA1 through FFC3 controlling the indicator lights for each of the furnace positions is applied through a suitable conductor to one input of the delivery controlling AND devices AA1D through ACD3, respectively, since the delivery operation requires that an ingot or workpiece is in the respective load positions of the furnace 10. This same feedback signal is applied to the entry position AND devices AA1E through AC3E, respectively, through the respective OR devices and the respective NOT device input of the respective AND devices to prevent an additional entry of a workpiece into a load position where a second workpiece is already present as indicated by the presence of an output signal for one or more of the respective FLIP-FLOP devices FFA1 through FFC3.

The initial control FLIP-FLOP devices FFA through FF3 are turned off by a momentary control signal from the upper position limit switch LSU shown in Fig. 2, to apply said momentary control signal to the Off input of each of the latter FLIP-FLOP devices to turn said FLIP-FLOP devices off through a common conductor 92.

The entry position limit switch LSE2 provides a control signal to the Off input of the entry controlling FLIP-FLOP device FFME to turn off the output of the latter FLIP-FLOP device when the crane leaves the entry position.

The delivery position limit switch LSD2 provides a suitable control signal to the Off input of the FLIP-FLOP device FFMD to turn off the output of the latter FLIP-FLOP device when the crane leaves the delivery table.

In Fig. 5 there is shown one suitable form of the FLIP-FLOP devices for the present control apparatus. A first control signal applied to the On input terminal 200 blocks the reset on one of the cores 202 or 204, depending upon the phasing of said control signal, causing that core to provide an output signal on the following half angle. This output signal is then fed back through conductor 206 and continues to block the reset of both cores 202 and 204, to thereby provide a full-wave output signal. A second control signal applied to the Off terminal 208 rests one of the cores 202 or 204, such that it does not provide an output signal during the next half cycle and therefore no feedback through conductor 206. This allows the other core to reset to result in a zero or no output signal.

In the operation of the control apparatus in accordance with the present invention, the operation will be illustrated by an example whereby a workpiece is to be removed from the entry position and the entry conveyor 12 and moved to the load position B2. First, the transfer switch 27 is closed to move the crane device 14 to its entry position, if it is not already in said entry position. Since the tongs 48 are in their upper position, the limit switch LSU, shown in Fig. 2, has already energized by an appropriate momentary control signal through the conductor 92 the Off inputs of the FLIP-FLOP devices FFA through FFC and FF1 through FF3 to turn off the operation of said FLIP-FLOP devices. The control button BE is closed on the entry control device 26. This energizes the On input of the FLIP-FLOP device FFB to energize through conductor 96 one input of each of the OR devices OA and OC. The output of the OR device OA energizes one input of each of the OR devices OA1E through OA3E through the conductor 110. The output of the OR device OC energizes through the conductor 114 one input of each of the OR devices OC1E through OC3E. Similarly, the OR device OA energizes one input of each of the delivery position OR devices OA1D through OA3D. The output of the OR device OC energizes one input of each of the OR devices OC1D through OC3D. This results in not energizing, because of the NOT devices, one input of each of the entry AND devices AA1E through AA3E and AC1E through AC3E, also, not energizing the NOT input of each of the delivery devices AA1D through AA3D and AC1D through AC3D such that all of the latter-said entry and delivery AND devices do not have one of their inputs energized since the NOT device does not have an output signal when its input is energized.

Closing of the control button 2E on the entry control device 26, shown in Fig. 1, energizes through the conductor 104, one input of each of the OR devices O1 and O3. The output of the OR device O1 energizes one input of each of the OR devices OA1E, OB1E and OC1E, also one input of the delivery control OR devices OA1D, OB1D, OC1D, the output of the OR device O3 energizes one input of each of the entry control OR devices OA3E, OB3E, OC3E, also one input of the delivery control devices OA3D, OB3D and OC3D. Thusly, in addition to the previously described AND devices for the entry and delivery control which were not energized through their NOT device inputs such that these AND devices do not have an output signal, the entry controlling AND devices AB1E and AB3E are not energized through their NOT device inputs and the delivery controlling AND devices AB1D and AB3D are similarly not energized through their NOT device inputs such that none of these additional AND devices have an output signal. This leaves only the entry control AND device AB2E and the delivery control AND device AB2D, which have not had their NOT devices energized such that the NOT device inputs of these AND devices are energized.

The entry table limit switch LSE1 provides an output control signal through its conductor 136 since the crane device 14 is now in its entry position to energize an input of the AND device AB2E. The conductor 136 is not connected to an input of the AND device AB2D, therefore, the latter device does not have an output signal since its input connected to the delivery table limit switch LSD1 through the conductor 140 does not receive an input signal. Therefore, the only AND device which could have an output signal as described so far, is the entry controlling AND device AB2E. The control button BE through the conductor 148 energizes an additional input of the AND device AB2E and the control button 2E through the conductor 156 energizes the fourth and last remaining input of the AND device AB2E, such that this AND device is provided with an output signal which is applied to the On input of the FLIP-FLOP device FFB2 to thereby energize the indicator light in column 2 and row B of each of the entry control device 26 and the delivery control device 34 shown in Fig. 1. Further, through conductor 180 the output control signal from the AND device AB2E is applied to an input of the OR device OME which is then provided with an output signal that is applied to the On input of the FLIP-FLOP device FFME to provide a control signal through conductor 164 which is applied through the amplifier GMB1 to an input of the OR device OMB1 to energize the motor for the bridge 24 to start the bridge 24 moving to the right, as shown in Fig. 1. The control signal through the latter conductor 164 is also applied through the amplifier device GMT1 to an input of the trolley controlling OR device OMT to energize the trolley motor to start the trolley of the crane device moving in a direction toward the rail 16.

Since both the control button BE and the control button 2E have been closed, the AND control device AW provides a control signal to one input of the AND device AME. The conductor 164, however, applies its input through the NOT input of the AND device AME such that this input is not energized due to the presence of an input control signal through the conductor 164, such that the AND device AME does not have an output signal.

Closing of the control button BE energizes through the amplifier GB the limit switch LSB. Closing of the control button 2E energizes through the amplifier G2 the limit switch LS2. These limit switches may be of the type including a control coil or winding that provides a magnetic field when energized and operative to change the position of some magnetic material in proximity to the field established by said control coil. This piece of magnetic material may carry a movable contactor and be pivotally carried by the trolley. In this regard, the coil may be mounted at some reference position and the piece of magnetic material carried by the movable device. More specifically, the coils for the limit switches LS1 through LS3 may be carried on some portion of the base supporting the crane device 14 or at some position fixed relative to the rail 18, as shown in Fig. 1. The coils for the limit switches LSA through LSC may be mounted at some position on the rail 22 or some other position on the bridge 24 with the piece of magnetic material for the limit switches LS1 through LS3 being carried by the crane device, such that when the crane device comes to the now energized limit switch LS2, the bridge 24 stops its movement. Similarly, the piece of magnetic material for the limit switches LSA through LSC may be carried by the crane device, and more specifically, the trolley of the crane device, such that when the trolley moves along the rails 20 and 22 of the bridge 24 until the now energized limit switch LSB is reached, the trolley stops its movement in a direction toward the rail 16, such that the tongs 48 are now positioned over the load position B2 for operation relative to the load position B2.

The above-described operation is applicable if two other control buttons are closed, for example, the AE button and the 3E button or the AD button and the 3D button and the like.

Although the present invention has been described with a certain degree of particularity, it should be understood that the present disclosure has been made only by way of example and that numerous changes in the details of construction and the combination and arrangement of parts may be resorted to without departing from the scope and the spirit of the present invention.

We claim as our invention:

1. In a control system for moving a load member between a predetermined one of a plurality of load positions arranged in a plurality of first rows of positions and in a plurality of second transverse rows of positions, the combination of a first control member for providing a first control signal corresponding to the one of said first rows in which said predetermined position is located, a second control member for providing a second control signal corresponding to the one of said second rows in which said predetermined position is located, a load positioning device operatively connected to said load member for moving said load member relative to said predetermined position, and a position control device operative with said load positioning device, with said position control device including a plurality of AND devices, with each of said AND devices having a plurality of inputs and being operative to provide an output signal only when all of its inputs are energized, with one of said AND devices being provided for each of said plurality of load positions, with said first control signal being applied to one input of the AND device provided for said predetermined position, with said second control signal being applied to another input of the latter AND device provided for said predetermined position, and with the output of the latter said AND device being operatively connected to said load positioning device for controlling the movement of said load member relative to said predetermined position, with said first and second control signals not being applied to one of the inputs of the others of said AND devices to thereby prevent said load positioning device from being moved relative to any of the others of said load positions.

2. In a control system for moving a load member relative to a predetermined position and from one of an entry position and a delivery position, said predetermined position being located in one of a plurality of first rows of positions and in one of a plurality of second transverse rows of positions, the combination of a first control member for providing a first control signal corresponding to a selected one of said first rows in which said predetermined position is located, a second control member for providing a second control signal corresponding to a selected one of said second rows in which said predetermined position is located, a load positioning device operatively connected to said load member for moving said load member relative to said predetermined position, and a position control device operative with said load positioning device and including a first AND device and a second AND device, with each of said AND devices having a plurality of inputs and being operative such that each of the latter said inputs must be energized before said AND device will provide an output signal, a third control member for providing a third control signal when said load positioning device is in said entry position, a fourth control member for providing a fourth control signal when said load positioning device is in said delivery position, with said first control signal being applied to one input of each of said first and second AND devices, with said second control signal being applied to one input of each of said first and second AND devices, with said third control signal being applied to one input of said first AND device, with said fourth control signal being applied to one input of said second AND device, with the output of said first AND device being operatively connected when all of the inputs of said first AND device are energized to said load positioning device for controlling the movement of said load member when said load positioning device is in said entry position, and with the output of said second AND device being operatively connected when all of the inputs of said second AND device are energized to said load positioning device for controlling the movement of said load member when said load positioning device is in said delivery position.

3. The control system of claim 2, and a fifth control member including a NOT device, with said fifth control member being operative for providing a fifth control signal when a second load member is already in said predetermined position, with said fifth control signal being applied to one input of each of said first and second AND devices through said NOT device such that when a load member is already in said predetermined position the latter said input of said first and second AND devices is not energized.

4. In a control system operative with first and second load members for moving said first load member to a predetermined position both in one of a plurality of first rows and one of a plurality of second rows, with said second rows being transverse to said first rows, the combination of a first control member for providing a first control signal corresponding to the one of said first rows in which said predetermined position is located, a second control member for providing a second control signal corresponding to the one of said second rows in which said predetermined position is located and a third control member for providing a third control signal when said second load member is already in said predetermined position, a load positioning device operatively connected to said first load member for moving said first load member relative to said predetermined position, and a position control device operative with said load positioning device and responsive to said first control signal for moving said load positioning device relative to the one of said first rows in which said predetermined position is located, said position control device being responsive to said second control signal for moving said load positioning device relative to the one of said second rows in which said predetermined position is located, and with said position control device being responsive to said third control signal for preventing the movement of said load positioning device to move said first load member relative to said predetermined position when a second load member is already in said predetermined position, said third control member including an electric MEMORY device operative to remember when said second load member is already in said predetermined position to provide said third control signal when said second load member is in said predetermined position.

References Cited in the file of this patent

UNITED STATES PATENTS

| | | |
|---|---|---|
| 367,332 | Baxter | July 26, 1887 |
| 2,082,393 | Hallenbeck | June 1, 1937 |
| 2,254,285 | Harris | Sept. 2, 1941 |
| 2,382,194 | Wood | Aug. 14, 1945 |
| 2,707,666 | Becker | May 3, 1955 |
| 2,726,774 | Newsom | Dec. 13, 1955 |
| 2,822,929 | Kruzic | Feb. 11, 1958 |
| 2,857,985 | Simmons | Oct. 28, 1958 |

FOREIGN PATENTS

| | | |
|---|---|---|
| 350,920 | Italy | July 26, 1937 |